Jan. 10, 1956   P. POIRETTE   2,730,009
PHOTO-ELECTRIC EXPOSURE METERS
Filed Aug. 22, 1951   2 Sheets-Sheet 1
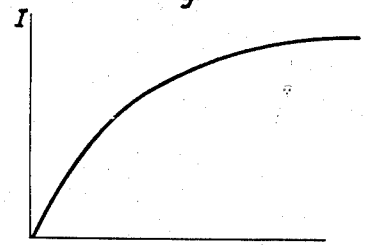
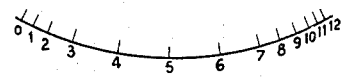
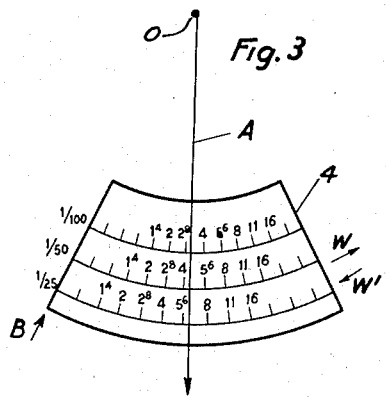
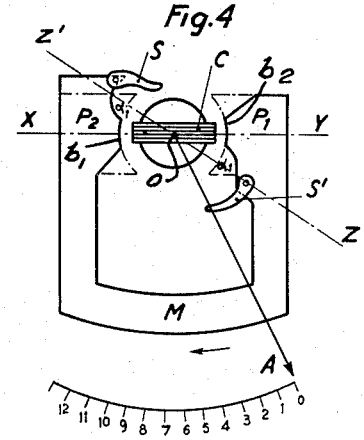
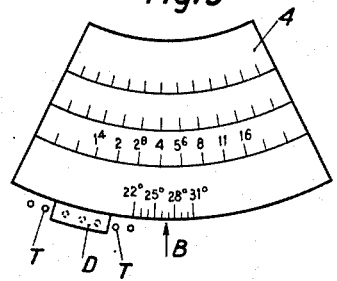
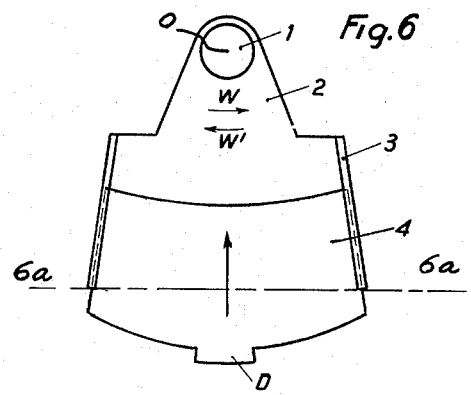
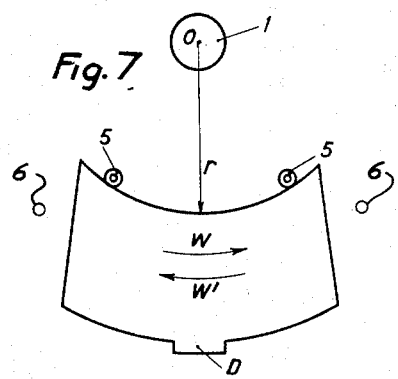
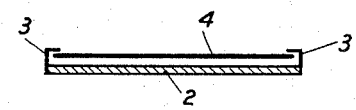
Inventor:
Paul POIRETTE
by: J. Delattre-Seguy
Attorney

United States Patent Office 2,730,009
Patented Jan. 10, 1956

2,730,009
PHOTO-ELECTRIC EXPOSURE METERS

Paul Poirette, Neuilly, France, assignor to Societe Marocaine d'Achats et de Constructions Somarac, Casablanca, French Morocco Application August 22, 1951, Serial No. 243,068

Claims priority, application France March 28, 1951

4 Claims. (Cl. 88—23)

My invention has for its object improvements in photoelectric exposure meters of the type disclosed in my prior copending specification Ser. No. 775,857 filed on September 24, 1947, for "Photoelectric exposure meters" now Patent No. 2,550,936 granted May 1, 1951.

It is a known fact that the scale of diaphragms as used for photographic purposes is established in a manner such that from one figure to the next, the amount of light admitted inside the camera is reduced by one half; in other words, if one diaphragm is replaced by the diaphragm having the immediately higher number which corresponds to a partial shutting off of light, it is necessary to provide a luminous intensity that is double in order to produce a negative having the same density as with the preceding diaphragm.

If, for instance, a negative having a proper density is obtained through the diaphragm numbered (f:5$^6$) of the International scale of diaphragms and if there is used for the next negative the following diaphragm of this scale (f:8) a negative of same density can only be obtained if the scene to be photographed is illuminated with a light intensity that is double or else if the time of exposure is double or again, if an emulsion is used the sensitivity of which is double that which has been precedingly used.

In my prior above mentioned specification, I resort to exchangeable dials that are gauged directly in values of diaphragms for a predetermined sensitivity or speed of emulsion, in order to allow the user to read directly and instantaneously his exposure meter without having to resort to a chart, abacus or ready reckoner of any type before he may correctly adjust his camera.

The exposure meter, according to my prior specification allows thus reading the number of the diaphragm to be used for the different times of exposures that may be foreseen, e. g. ⅕, ⅙₀, ⅟₁₀₀, ⅟₂₀₀ of a second. But it is still necessary to change the dial each time the sensitivity of the emulsion is changed.

Now, my present invention relates to exposure meters of this type and incorporates thereto a dial that is gauged for direct reading, while it is capable of being shifted in its plane with reference to the indicator hand, either towards the right or towards the left of the observer, according to the sensitivity of the emulsion used, to an extent such that the operator may read directly and instantaneously data that are always accurate, whatever may be the sensitivity of the emulsion that is being used.

It will be readily understood that, if e. g. after reading diaphragm f:5$^6$ for a predetermined luminous intensity, the emulsion is changed for an emulsion having a sensitivity twice higher, it is necessary to read the value of the next diaphragm, i. e. f:8.

Such requirement shows the advantage, presented by this invention, of associating on a same dial direct readings corresponding to various sensitivities of emulsion, whereas previously each dial carried on each of its surfaces only the scale or scales corresponding to a single emulsion.

Indeed, in the exposure meters executed heretofore, the advantages of this invention could not be realized because, to obtain them, it is necessary for the spacing of the graduations of a scale to be equal in spite of successive increases of light intensity corresponding to a multiplication by 2 and consequently, it is necessary to gauge a linear scale of reading in correspondence with a geometrical progression of light intensities the ratio of which is equal to two.

Now the curve of operation of conventional photo-cells used in exposure meters, has always shown an inflexion corresponding to a narrowing of the scale subdivisions at the ends of such scales; this prevented hitherto the use of a rotary dial of the type provided according to the invention, the scale subdivision of which should in principle remain equally spaced throughout the scale of a diaphragm, whatever may be the diaphragm considered.

My invention solves this problem as follows:

The desired linear equal spacing of the scale subdivisions in any one of the scales carried by one face of the exchangeable dials of this exposure meter is made possible by means of a novel galvanometer the field of the magnetic circuit of which varies during the angular shiftings of the movable frame carrying the indicating hand of the meter, in accordance with a law of correspondence that makes up for the deflection of the curve of operation of the photocell with reference to linearity. Through this arrangement which will be disclosed with further detail hereinafter, it is possible to provide on a same dial a series of scales corresponding each to a predetermined speed of closing, while the intervals between the subdivisions of a scale remain equal throughout said scale. It is consequently possible to construct a meter with a dial that can be shifted in accordance with the sensitivity of the emulsion that is being used.

In accompanying drawings illustrating by way of example various embodiments of my invention:

Fig. 1 illustrates the curve of operation of a conventional photo-cell.

Fig. 2 illustrates a conventional scale as previously provided, the subdivisions of which are closer at both ends of the scale.

Fig. 3 shows a gauged dial executed in accordance with the invention, that is capable of pivoting in the direction of the arrows W, W' under the hand A with reference to a reference mark B.

Fig. 4 shows a galvanometer according to the invention.

Fig. 5 illustrates a detail of the control elements and reference marks for the dial.

Fig. 6 is an example of the mounting of the shiftable dial inside the exposure meter.

Fig. 6a is a cross-sectional view taken along line 6a of Fig. 6.

Fig. 7 illustrates a modification of the invention.

Figure 8:
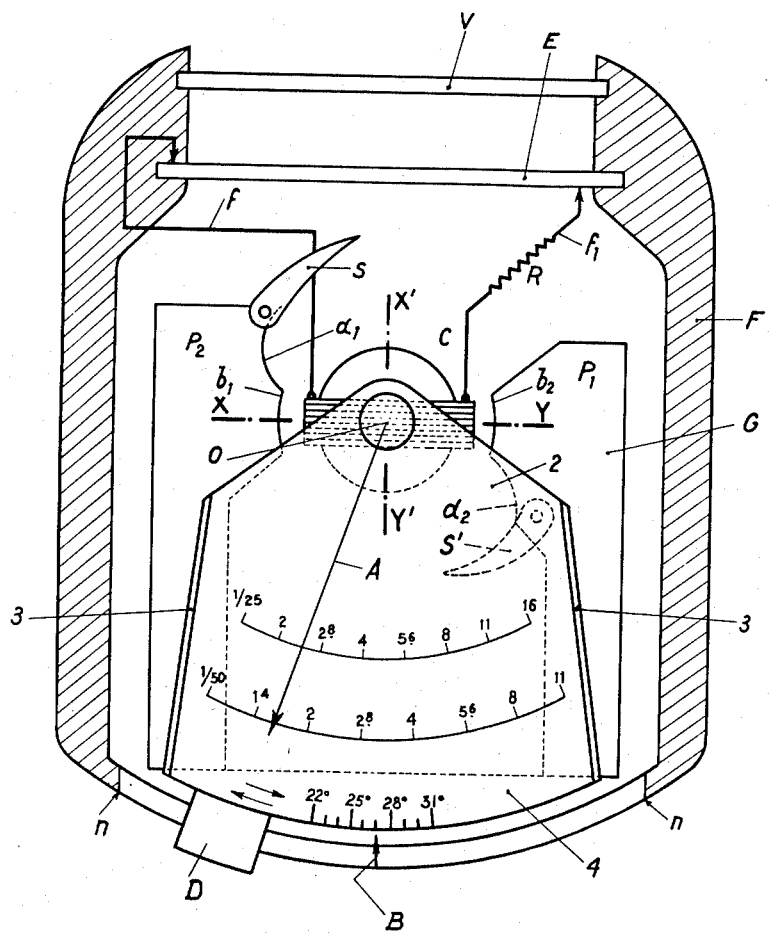
Fig. 8 shows, partly in cross section and partly in front elevation, an assembly of the exposure meter according to the invention.

The movable frame C and the hand A that is rigid therewith forming part of the galvanometer illustrated diagrammatically in Fig. 4 and that allows, according to the invention, using a shiftable dial can oscillate around axis O. Said frame and hand are deflected according to a linear law, by reason of the special shape given to the pole-pieces P–1 and P–2 of the magnet M. There is illustrated in said Fig. 4 in dot-and-dash lines the outline assumed by the pole pieces in a conventional galvanometer magnet. According to my invention, these polepieces are now substantially conical and shaped so as to show each a recess respectively at α1 and α2, said recesses being directed along an axis Z—Z' that is oblique with reference to the transverse axis X Y which is the axis of the zone of maximum sensitivity of the galvanometer as provided through a maximum concentration of the magnetic flux in the frame C. It will be readily understood that in the neutral or starting position of the frame C along the axis XY for which said frame C assumes its starting position illustrated in Fig. 4 while the hand carried by it is on the zero, this concentration of the magnetic flux will make up for the very low energy of the cell feeding the electromagnet winding, which cell is then illuminated to a very small extent. This spreads the starting divisions of the scale (1, 2, 3, in Fig. 4) which in a conventional meter are squeezed together as shown in Fig. 2.

Furthermore, the outline of the pole-pieces P–1 and P–2 recessed, as disclosed, at α1, and α2 produces a reduction in the magnetic flux that passes through a minimum value for the axis Z—Z' which corresponds to the position of the hand in the middle of the scale. Prior exposure meters always showed for this central portion of the reading scale, an expansion of the spacings between the scale subdivisions in contradistinction with their closer arrangement at the outer ends of the scale. This expansion at the middle of the scale (see divisions 4 to 7 of Fig. 2 for instance) is remedied by the shape of the pole-pieces P–1 and P–2, and particularly of the recesses α–1 and α–2. The closer spacing at the upper end of the scale (see divisions 8 to 12 of Fig. 2 for instance is done away with by the association of the recesses referred to with a further arrangement to be now disclosed.

In order to concentrate the field at the upper end of the scale of diaphragms, as generally required for restoring linearity to the said scale, there are provided two adjustable shunt sections S and S–1 extending the magnet core in the direction illustrated. The concentration thus afforded for the field should be, however, somewhat moderate as, in the corresponding part of the curve, the photo cells produce a substantially increasing energy. These movable and adjustable shunt sections provide accurate linearity for the upper part of the scale (see divisions 8 to 12 in Fig. 4) in order to make up for the curvature assumed by the curve of operation of the photo cell.

An appropriate combination of the conical shape of the pole-pieces, resulting in the narrow faces b–1 and b–2 (Fig. 4) with the shape of recesses α–1 and α–2 and the adjustment of shunts S and S1 permits to secure the equidistance of all graduations over the entire scale.

It is, consequently, possible to resort to a translational or rotational movement of the dial 4 according to arrows W and W1, Fig. 3, that is gauged for the direct reading of diaphragm values for varying light intensities on various scales corresponding each to a different time of opening provided by the camera shutter: $\frac{1}{25}$, $\frac{1}{50}$, $\frac{1}{100}$, $\frac{1}{200}$ of a second (Fig. 3), said speds being given by way of a mere exemplification.

It is furthermore possible to utilize said shifting movement of the dial to obtain said direct readings of diaphragm values for several sensitivities of emulsion, as explained hereafter.

The direct readings are permitted by placing the dial directly under hand A (Fig. 3) between the hand and the galvanometer, so that the hand A spans the visible surface of dial 4.

Moreover, to use the features and advantages of this invention, dial 4 (Figs. 3, 5 and 6) is pivotably and concentrically mounted around axis O of frame C (Fig. 4) which is at the intersection of lines X—Y and Z—Z'. This mounting can be made in any suitable way, one of which is illustrated in Fig. 6 and consists of pivoting support plate 2. In any event, the motion of plate 2 and dial 4 is independent from that of hand A and of its associated galvanometer frame C. The scales on the dials are concentric to axis O.

Obviously, the necessary limitation in bulk restricts the amplitude of pivotal shifting that may be given to the dial, which shifting should be limited to the space occupied by three or four subdivisions of the scale in the actual state of the art, i. e. one or two subdivisions to either side of a medial position.

This drawback is removed according to the invention by printing scales on the surfaces of a number of interchangeable dials. I obtain thus dials carrying altogether scales corresponding to eight or ten emulsions whereas precedingly only one scale could be used on each side of the dial, each scale corresponding to a single emulsion. Admitting e. g. a shifting by two subdivisions respectively towards the right and towards the left, i. e. by two diaphragm values for each surface of the dial and admitting the sensitivity is double from one division to the next, a dial that is printed on each surface, may serve for emulsions the sensitivities of which may vary in a ratio as between 1 and 128 at least, if the two sides of the dial are considered. But these figures are not to be considered as a limitation, as the exposure meter equipped in accordance with the invention, may carry selectively one of a plurality of interchangeable pivoting dials as is the case also for the exposure meter described in my prior specification. For these purposes, the dial used is removably inserted in the meter, as illustrated diagrammatically in Fig. 6, so that the dial may be turned upside down to expose either of its faces.

Fig. 5 shows a scale of reference marks for different emulsion sensitivities along the edge of a movable dial 4 and adapted to be shifted in front of a stationary mark B affixed upon or engraved in a stationary portion (for instance the casing, not shown) of the exposure meter so as to allow an easy and reliable adjustment of the location of the dial for any predetermined emulsion.

A projection D rigid with the dial and projecting outwardly with reference to the instrument, allows the operator to execute readily a shifting of the dial. Recesses T are provided on a stationary part of the casing of the exposure meter and may carry abutments stopping the dial in either of its extreme positions corresponding for instance respectively to a comparatively slow color emulsion and to a white-and-black emulsion that is substantially more rapid.

This auxiliary arrangement allows an instantaneous adjustment without any risk of mistake for the operator controlling at the same moment e. g. two cameras the films in which carry different emulsions.

In Fig. 5, for simplification, only one arbitrary scale of diaphragms has been graduated. It is obvious that the use of several scales on one face of a dial multiplies the possible combinations of light intensity, speed of opening and emulsion sensitivity.

As an illustration of the construction and operation of this invention, the scale of emulsion sensitivities appearing at the lower edge of the dial in Fig. 5 is in degrees Scheiner. It is well known that in that scale, an increase of 3 degrees, for instance from 25 to 28, represents doubling the emulsion sensitivity. An emulsion of 28° therefore requires half as much luminous intensity as one of 25°. If it is assumed that, for the shutter speed of the graduated scale on Fig. 5 and for an emulsion sensitivity of 25°, indicated when the number 25 on the lowest scale is square with mark B, hand A is over division 4 of the scale of diaphragms, then, if an emulsion of 28° sensitivity is next used, assuming the same light intensity, dial 4 will be shifted pivotally, leftward on Fig. 5, to bring the number 28 of the sensitivity scale in front of fixed mark B; hand A will have remained on mark B; the result of this shift of the dial is to bring under hand A, on the scale of diaphragms, division 5.6; similar direct readings would be obtained by pivotal shift of dial 4, upon use of emulsions of greater or lesser sensitivity. Therefore, this invention allows direct instantaneous readings of a diaphragm corresponding to a given shutter-speed and to a given emulsion sensitivity, and allows adjustments of said direct readings over a substantial range of emulsion sensitivities, either on the use of a face of a dial or by exchanging dials or faces thereof. The only precaution required is, on the first take, to bring the number indicating the sensitivity of the emulsion used in alignment with fixed mark B.

Since the dials can be turned, so as to use both faces, or interchanged, one face of a dial can be for a substantial range of emulsion sensitivity, say 22 to 31° Scheiner, and the other face, or another dial for a different range, say 31 to 40°.

Figs. 6 and 6a illustrate the mounting of the dial 4 inside the slideways 3 of a plate 2 pivoting round the spindle 1 as illustrated by the arrows W, W'. Spindle 1 is coaxial with axis O (Fig. 4) and plate 2, with dial 4, may be located, as shown in Fig. 3, immediately under hand A, between the latter and the galvanometer. Spindle 1 permits the pivotal shifting of plate 2 with dial 4; the latter is slidingly engaged in slideways 3 of plate 2, through a suitable slot in the casing (not shown). Thus dials of a set, or two faces of a dial can be exchanged, and any face of any dial used at will. As illustrated in the modification of Fig. 7, the support plate 2 (Fig. 6) is eliminated; the dial shifts on directions W or W' concentrically to axis O by sliding on two rollers 5, located on a circle having O for center, the edge of the dial in contact with said rollers forming an arc of circle centered at O and the radius $r$ of which is the distance from O the point of contact, as shown in Fig. 7. The pivotal switching of the dial is limited by suitable means, such as stationary lateral stops 6; these and rollers 5 are attached to the casing. If the dial is transparent, hand A can sweep under it.

I provide thus a photoelectric exposure meter allowing a direct instantaneous reading on interchangeable dials of the type already disclosed in my above mentioned prior specification and each dial may be used in its turn after translational movements in its own plane selectively for several sensitivities of emulsion. This is possible by reason of the presence on said movable dials of one or more scales the subdivisions of which provide for a succession of diaphragm values that are equidistant from one another.

This equidistance is provided in its turn by the special shape given to the pole-pieces of the galvanometer magnet that ensures a predetermined law of variations for the magnetic field in which the movable frame is adapted to move. This law is such that the angular deflections of the hand are equal each time the luminous intensity measured by the photo-cell has increased in a ratio as between 1 and 2 or has decreased in a ratio as between 2 and 1. In other words, the successive deflections by equal angles of the hand illustrate the successive values of the geometrical progression of luminous intensities the ratio of which is equal to 2.

Thus, each translational movement by one subdivision of the movable dial in the plane of the latter in either direction, allows the instantaneous reading of the diaphragm values corresponding to an emulsion the sensitivity of which is equal to ½ or to twice that of the preceding emulsion, according to the direction of translational movement, and this remains true for all the displacements of the dial, whatever their magnitude may be within predetermined limits.

Figure 8 shows a complete exposure meter according to my invention. Such a device comprises a galvanometer G and the photo electric cell E protected by a transparent glass V; the cell E activates movable frame C by means of the two conducting wires $f$ and $f_1$ and through a calibrating resistance R. The other parts illustrated in Fig. 8 bear the same reference characters as the corresponding parts illustrated in, and described by references to, Figs. 4, 5 and 6, and further description thereof would be superfluous. All the effective parts, referred to above, of the galvanometer are enclosed in a frame F, the lower wall of which is slotted between $n$–$n$, the slot being adapted to permit the introduction or removal of the dial 4 in the slideways 3. Operating projection D projects through said slot outside the frame. In Fig. 8, the pivoting support plate 2 is shown superimposed on the galvanometer G and centered on the intersection of axes $x$—$y$ and $x'$—$y'$. The stationary mark B is affixed to the frame. Only two scales of exposure speeds have been illustrated on dial 4 of Fig. 8, but there may be more, as shown in Fig. 3. Dial support plate 2 is operatively connected to the galvanometer G and can oscillate leftward or rightward. The operation and method of use of this exposure meter has been fully described heretofore.

What I claim is:

1. In an exposure meter controlled by a photo-cell and including a privoting indicator hand, in combination: at least one removable dial carrying on at least one face a plurality of concentric scales of diaphragm values each of said scales corresponding to a shutter speed, said values over each scale being equidistant from each other, and carrying on the same face a scale of a substantial range of emulsion sensitivity values; the angular deflections of said hand corresponding to a change in a given ratio of the luminous intensity influencing said photo-cell being equal to each other; and means for shifting said dial concentrically to the pivot of said hand and by predetermined amounts of said range of emulsion sensitivity values with reference to said hand; said plurality of scales of diaphragm values, said corresponding shutter speeds, and said scale of emulsion sensitivity being simultaneously visible and readable on a single face of said dial; whereby diaphragm values are readable directly for various values of emulsion sensitivity over said range.

2. In an exposure meter controlled by a photo-cell and including a pivoting indicator hand, in combination: at least one removable dial carrying on at least one face a plurality of concentric scales of diaphragm values each of said scales corresponding to a shutter speed, said values over each scale being equidistant from each other for variations in a first given ratio of the luminous intensity influencing said cell, and carrying on the same face a scale of a substantial range of emulsion sensitively values; the angular deflections of said hand corresponding to a change in a second given ratio of said luminous intensity being equal to each other; and means for shifting said dial over said range concentrically to the pivot of said hand and by predetermined amounts of said range of emulsion sensitivity values with reference to said hand; said plurality of scales of diaphragm values, said corresponding shutter speeds, and said scale of emulsion sensitivity being simultaneously visible and readable on a single face of said dial; whereby diaphragm values are readable directly for various emulsion sensitivity values over said range.

3. An exposure meter as claimed in claim 2, in which said first and second ratios are equal to 2.

4. In an exposure meter controlled by a photo-cell and including a pivoting indicator hand, in combination: at least one removable dial carrying on at least one face a plurality of concentric scales of diaphragm values each of said scales corresponding to a shutter speed, said values over each scale being equidistant from each other, and carrying on the same face a scale of a substantial range of emulsion sensitivity values; a galvanometer controlling the movements of said hand and comprising an angularly movable frame rigid with said hand, and electromagnetic polepieces facing said frame; said pole-pieces being constructed and adapted to equalize the flux produced by the action of said photo-cell on said galvanometer at all positions of said frame; the angular deflections of said hand corresponding to a change in a given ratio of the luminous intensity influencing said photo-cell being thereby equal to each other; and means for shifting said dial concentrically to the pivot of said frame and by predetermined amounts of said range of emulsion sensitivity values with reference to said hand; said plurality of scales of diaphragm values, said corresponding shutter speeds, and scale of emulsion sensitivity being simultaneously visible and readable on a single face of said dial; whereby diaphragm values are readable directly over said range for various emulsion sensitivity values; said pole-pieces comprising recesses registering with said frame over the middle zone of its angular motion, and further comprising adjustable shunt sections forming extensions of the magnetic circuit of said pole-pieces, said shunt sections being constructed and adapted to adjustably control the flux at the positions of said frame corresponding to the impingement of high light intensities on said photocell.

References Cited in the file of this patent

UNITED STATES PATENTS

| | | |
|---|---|---|
| 2,308,469 | McMaster | Jan. 12, 1943 |
| 2,353,163 | Kienath | July 11, 1944 |
| 2,550,936 | Poirette | May 1, 1951 |

FOREIGN PATENTS

| | | |
|---|---|---|
| 863,453 | France | Dec. 7, 1939 |
| 522,919 | Great Britain | July 1, 1940 |
| 570,429 | Great Britain | July 6, 1945 |
| 268,562 | Switzerland | Dec. 18, 1947 |
| 614,330 | Great Britain | Dec. 14, 1948 |